US009287936B2

(12) United States Patent
Ali et al.

(10) Patent No.: US 9,287,936 B2
(45) Date of Patent: *Mar. 15, 2016

(54) WIRELESS POWER TRANSFER TO EMBEDDED SENSORS

(71) Applicant: University of South Carolina, Columbia, SC (US)

(72) Inventors: Mohammod Ali, Irmo, SC (US); Juan Caicedo, Columbia, SC (US); Xiaohua Jin, Columbia, SC (US)

(73) Assignee: University of South Carolina, Columbia, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/571,868

(22) Filed: Dec. 16, 2014

(65) Prior Publication Data

US 2015/0147965 A1 May 28, 2015

Related U.S. Application Data

(63) Continuation of application No. 13/110,052, filed on May 18, 2011, now Pat. No. 8,913,952.

(60) Provisional application No. 61/395,839, filed on May 18, 2010.

(51) Int. Cl.
| H04B 5/00 | (2006.01) |
| H01Q 1/22 | (2006.01) |
| H01Q 7/00 | (2006.01) |
| H04B 7/24 | (2006.01) |
| H02J 7/02 | (2006.01) |

(52) U.S. Cl.
CPC ............ *H04B 5/0037* (2013.01); *H01Q 1/2225* (2013.01); *H01Q 7/00* (2013.01); *H04B 5/0043* (2013.01); *H04B 5/0081* (2013.01); *H04B 7/24* (2013.01); *H02J 7/025* (2013.01)

(58) Field of Classification Search
CPC .. H04B 5/0037; H04B 5/0043; H04B 5/0075; H04B 17/003; H04B 2203/5458; H02J 7/025
See application file for complete search history.

(56) References Cited

U.S. PATENT DOCUMENTS

| 6,796,187 | B2 | 9/2004 | Srinivasan et al. |
| 6,838,873 | B2 | 1/2005 | James et al. |
| 7,343,136 | B2 | 3/2008 | Liu et al. |
| 7,398,164 | B2 | 7/2008 | Ogushi et al. |
| 8,050,907 | B2 | 11/2011 | Baisley et al. |
| 8,542,017 | B2 | 9/2013 | Aerts |
| 8,913,952 | B2 * | 12/2014 | Ali et al. ............. 455/41.1 |
| 2007/0231614 | A1 | 10/2007 | Kondo et al. |
| 2011/0074342 | A1 | 3/2011 | MacLaughlin |
| 2012/0164943 | A1 | 6/2012 | Bennett |

* cited by examiner

*Primary Examiner* — Andrew Wendell
(74) *Attorney, Agent, or Firm* — Dority & Manning, P.A.

(57) ABSTRACT

In certain embodiments of the present disclosure, a wireless sensor system is described. The wireless sensor system includes a near-field wireless power transfer component, at least one measurement sensor, and an antenna. The antenna is in communication with the measurement sensor and can transmit measurements from the measurement sensor. The near-field wireless power transfer component can wirelessly receive power to operate the measurement sensor.

14 Claims, 5 Drawing Sheets

WIRELESS POWER TRANSFER TO EMBEDDED SENSORS

CROSS-REFERENCE TO RELATED APPLICATION

The present application is a continuation application of U.S. application Ser. No. 13/110,052 having a filing date of May 18, 2011 and issued as U.S. Pat. No. 8,913,952 on Dec. 16, 2014, which was based on and claims priority to U.S. Provisional Application Ser. No. 61/395,839 having a filing date of May 18, 2010, which is incorporated by reference herein.

GOVERNMENT SUPPORT CLAUSE

This invention was made with government support under ECS-0619253 awarded by the National Science Foundation. The government has certain rights in the invention.

BACKGROUND

Much of the infrastructure that supports the smooth operation of our society (bridges, roads, and the like) is old and is in need of critical repair. Due to the lack of real-time monitoring of critical conditions, such as strain, humidity, and corrosion, accidents have occurred in the past, such as the bridge collapse in Montreal, Canada in 2006 or the bridge collapse in Minneapolis, Minn. in 2007. Such accidents cost precious life, time, and financial resources. Vigorous discussions and activities are taking place both in terms of monitoring the status of existing bridges as well as what to do with future bridges and infrastructure that are yet to be built. If new innovative solutions are not developed, future cost to maintain any newly built infrastructure will be staggering.

At present, a great deal of research activity is ongoing in the sensors front. Sensing systems and sensor networks are geared to the real-time health monitoring of existing bridges. Many of these techniques involve plug-and-play solutions of existing techniques. For example, a strain sensor is embedded inside the concrete which measures the strain in the steel reinforcement. The measured data is then transferred using a wire to an outside wireless transceiver which then sends all data to a host computer for further analysis and processing. The cost and complexity of cabling is very high. Besides, wiring is prone to damage itself due to corrosion resulting from water and chloride ingress. Major advantages of wireless sensors over traditional wired sensors are their low cost and ease of installation. Furthermore, wireless embedded sensors have improved reliability over conventional wired sensors since the presence of wires within an infrastructure creates the possibility of loss of connection due to crack and corrosion resulting from changes in their surrounding environment.

Conventional radio frequency identification device (RFID) sensors typically only operate when a reader sends a signal to energize such RFID sensors.

As such, improved sensors are desirable. Methods related to such sensors would be particularly beneficial.

SUMMARY

Aspects and advantages of the disclosure will be set forth in part in the following description, or may be obvious from the description, or may be learned through the practice of the disclosure.

In certain embodiments of the present disclosure, a wireless sensor system is described. The wireless sensor system includes a near-field wireless power transfer component, at least one measurement sensor, and an antenna. The antenna is in communication with the measurement sensor and can transmit measurements from the measurement sensor. The near-field wireless power transfer component can wirelessly receive power to operate the measurement sensor.

In yet other embodiments of the present disclosure, a reinforced concrete element is described. The reinforced concrete element includes a reinforcing bar, concrete, and a wireless sensor. The wireless sensor is positioned on the reinforcing bar. The wireless sensor includes a near-field wireless power transfer component, at least one measurement sensor, and an antenna. The antenna is in communication with the measurement sensor and can transmit measurements from the measurement sensor. The near-field wireless power transfer component can wirelessly receive power to operate the measurement sensor.

These and other features, aspects and advantages of the present disclosure will become better understood with reference to the following description and appended claims.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure describes sending wireless power to sensors that are located in hard to reach areas. These include, but are not limited to, any wireless transmitters in need of power but are embedded inside an infrastructure or other structures that cannot be easily modified. Potential industrial applications for the invention described herein include, but are not limited to wireless embedded sensors for infrastructure monitoring including bridges, buildings, pipelines, power lines, dams, or the like. Applications also include hazardous waste processing and removal facilities, nuclear waste monitoring, biomedical applications, or the like.

It should be understood that the sensors described herein are completely different from present day RFID (radio frequency identification device) tags that only operate when a reader sends a signal to energize them. The sensors described herein are "smart" wireless sensors which are battery operated. The smart sensors, when placed in appropriate locations of the structure, measure strain, humidity, acceleration etc. and then communicate such data to other sensors and/or to a supervisory base station. The sensors operate independently and are capable of processing information and of making decisions and hence are referred to as smart sensors. The systems described herein can include techniques that mimic biological organisms. The structure will be instrumented with a dense network of embedded wireless sensors. When damage is identified on the structure, the sensor network will react the same way that the human body reacts to pain by sending a warning signal to the base station for personnel to review critical measurement data and take decisions thereof.

The present disclosure contemplates low-cost solutions such as wireless sensor "dust" that can be embedded within the infrastructure when the structure itself is built. These sensors will include: (1) sensing module (strain, humidity, acceleration etc.), (2) a small wireless transceiver and antenna, (3) a small micro-controller and memory, and a (4) small battery. All data processing will occur at the nearby base station where the sensors will send their measured data wirelessly.

Figure 1:
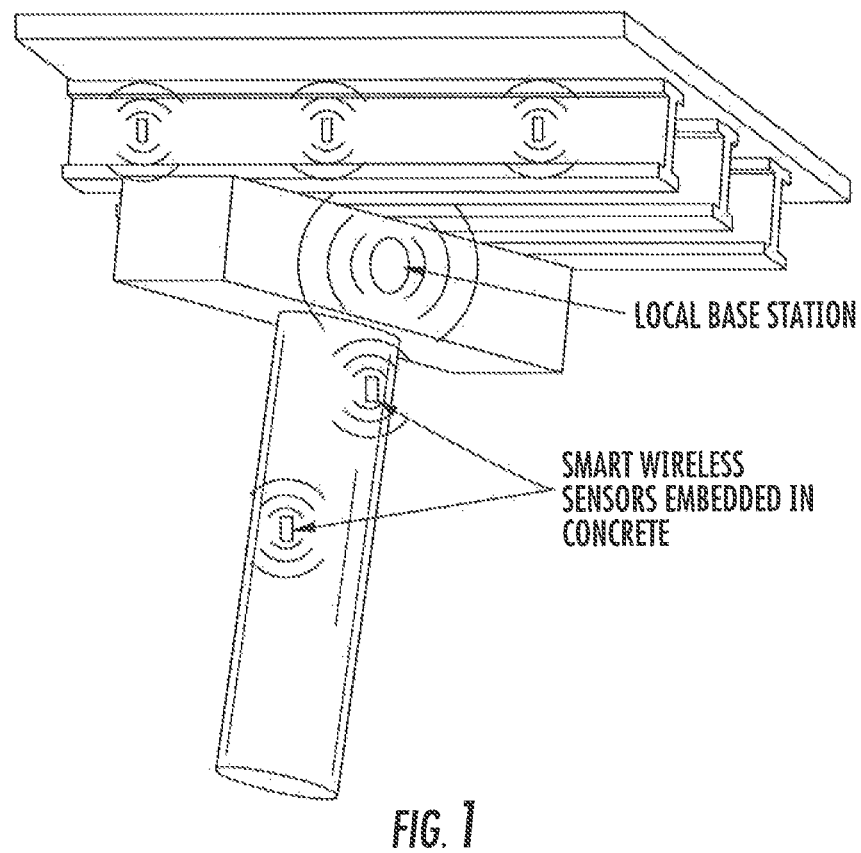
FIG. 1 illustrates embedded wireless sensors within a bridge pier in accordance with certain aspects of the present disclosure.
Figure 2:
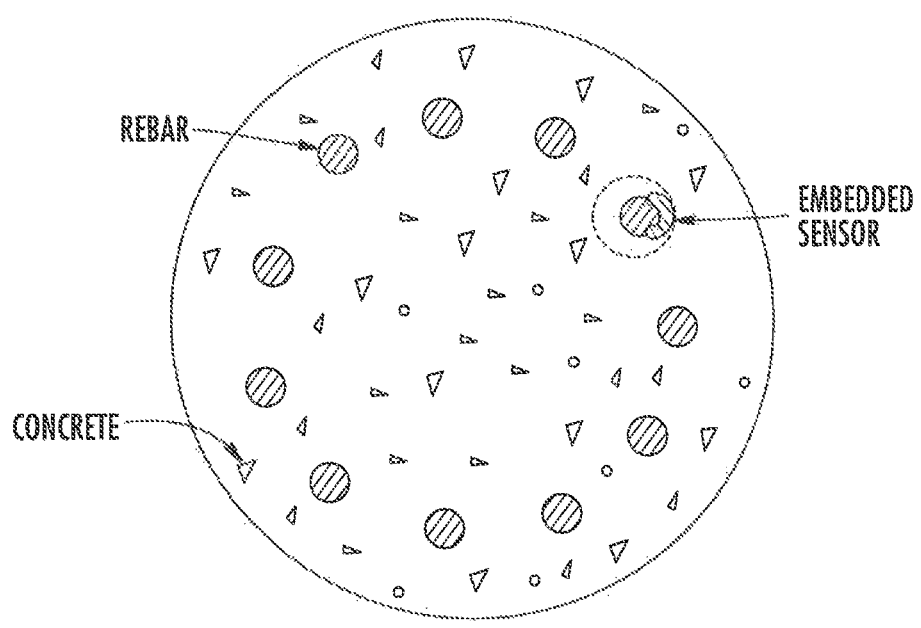
FIG. 2 illustrates a cross-section of typical bridge pier with an embedded sensor network in accordance with certain aspects of the present disclosure.
Figure 3:
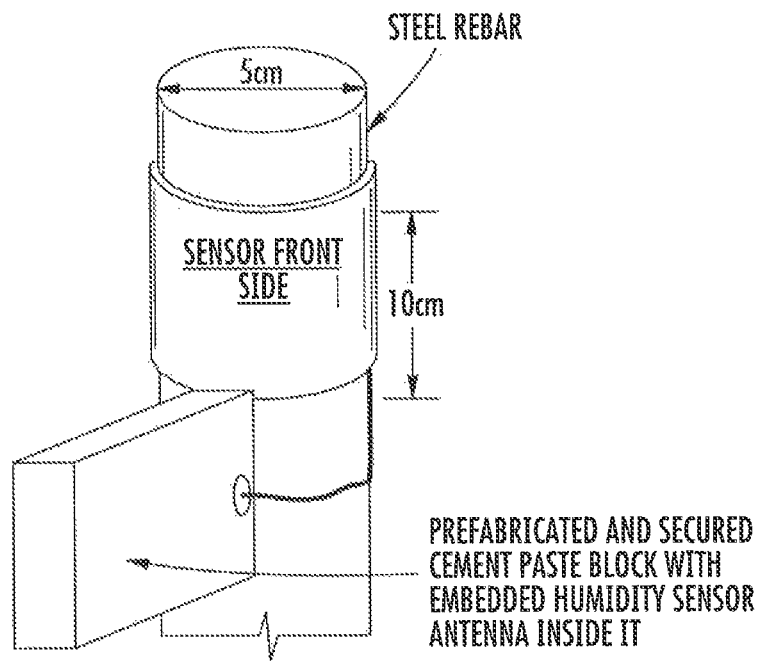
FIG. 3 illustrates a sensor on steel reinforcement in accordance with certain aspects of the present disclosure.

The present disclosure seeks to address the challenges of structural health monitoring by focusing on wireless embeddable sensors as seen in FIG. 2. The system level representation shown in FIG. 1 illustrates the basic operating principles of the embedded sensors of the present disclosure. There are two sensors: a strain sensor and a humidity sensor (as illustrated in FIG. 3). The patch wrapped around the steel reinforcement is embedded about 5-15 cm below concrete and contains a wireless power receive coil. This coil directly faces an external coil. The patch on the back side of the reinforcing bar (referred to herein as "rebar") contains the strain sensor circuits, a voltage multiplier circuit, a battery, and a small 900 MHz RF transceiver chip. A prefabricated block made of cement paste is shown attached and secured to the steel reinforcement. The block contains a dual function humidity sensor antenna as further described herein. The design is similar to that of dobies that are already being used in construction to keep the rebar away from the form. Concrete mix will be poured in to complete the construction with all sensors and circuits in place and secured. The RF signal from the antenna leaves the concrete surface of the pier and travels in free-space towards the local base station (illustrated in FIGS. 1 and 2). Thus the only time the RF signal faces larger than usual attenuation is when it travels through the about 5-15 cm of concrete covering the antenna.

Figure 7:
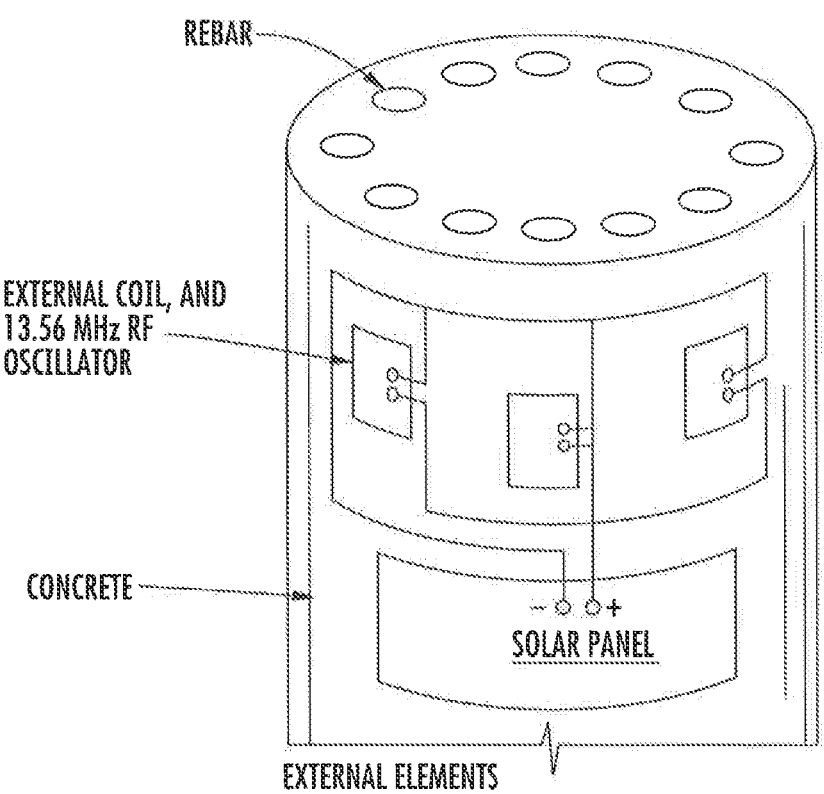
FIG. 7 illustrates an external coil implementation in accordance with certain aspects of the present disclosure.

A typical external low cost coil deployment scenario is illustrated in FIG. 7. A solar panel divides DC electric power among several external coupled resonant sensor patches. Where solar energy is unavailable, energy from other sources can be used. Each resonator patch includes a high efficiency 13.56 MHz RF oscillator and a transmit coil. The external coil generates the necessary magnetic fields near the embedded coil.

Figure 4:
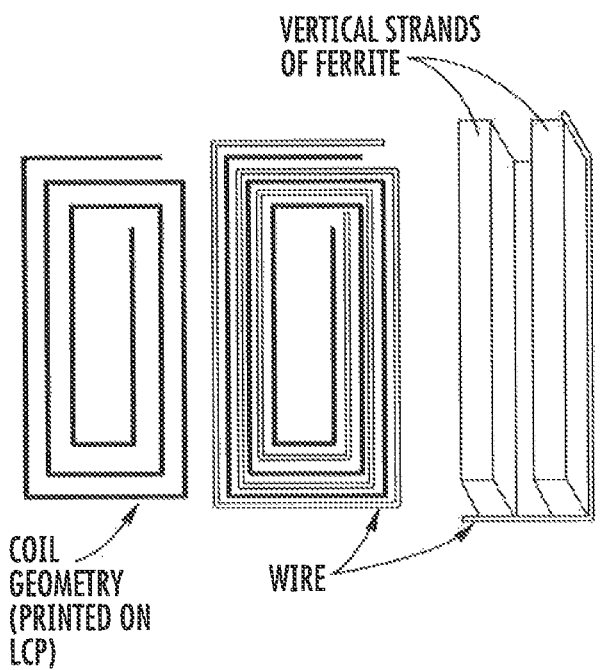
FIG. 4 illustrates coil geometries in accordance with certain aspects of the present disclosure.

Directly underneath each external coupled resonator patch and under 5-15 cm of concrete a wireless embedded sensor is placed and secured on the steel reinforcement (rebar) of the bridge pier or girder as shown in FIGS. 3 and 4. Each embedded sensor is placed only at a critical location of the structure and can be formed of (1) a 13.56 MHz wireless power receive coil fabricated on liquid crystal polymer (LCP) films and placed on ultra-thin ferrite films, a voltage multiplier circuit having low forward drop (PMEG 1020EA) chip diodes, and a rechargeable battery; (2) a strain measurement sensor, AD converter, amplifier, an off the shelf RF wireless transceiver and a low pass filter all fabricated on a flexible low hygroscopic LCP film, and (3) a dual function humidity sensor antenna that can measure humidity in concrete and also function as a wideband communication antenna. A wireless base station sends and receives data from the wireless embedded sensors.

A sensor embedding scenario in accordance with the present disclosure is shown in FIG. 2. A small, flexible, and efficient receive coil which can be readily placed and secured on a rebar is illustrated. The receive coil will be embedded under about 5-15 cm of concrete. Each cylindrical rebar has a diameter of about 5 cm. The separation between two adjacent rebars is about 12.5 cm. Since the embedded receive coil must be placed on the front surface of the rebar such that it directly faces the external coil it must be placed on the front half circumference of the rebar, which is about 8 cm. Thus since the coil's horizontal dimension is restricted by its field of view the coil's longer dimension must be along the length of the steel reinforcement. For a rectangular coil in free-space the magnetic field strength at a distance x from it can be calculated as:

$$H = \frac{NIab}{4\pi\sqrt{(0.5a)^2 + (0.5b)^2 + x^2}} \left( \frac{1}{(0.5a)^2 + x^2} + \frac{1}{(0.5b)^2 + x^2} \right) A/m$$

where a and b are the length and width of the coil, N is the number of turns, I is the current, and x is the distance from the center of the coil to a point at which the field is calculated. For instance, a coil (in free-space and on a planar surface) with horizontal length of 8 cm and vertical length of 10 cm and with 5 turns and 50 mA current flowing through it the magnetic field at a distance of 5 cm from the coil's center is 0.8696 A/m. To charge the battery of a sensor much smaller magnetic field strength (about 0.1 A/m) is needed. Solar panels that drive the external coil will be easily able to generate such magnetic fields near the receive coil. For instance, a 9V SPE-350-6 solar panel with dimensions 4.5 inch by 8.25 inch provides 350 mA of current.

The space between the external coil on the pier surface and the embedded coil on the steel reinforcement is not free-space. It is filled with 5-15 cm of concrete. The dielectric constant and conductivity of concrete change with the moisture content present in there. Wave reflections and transmission will occur at the air concrete interface. Since each embedded receive coil will be printed on a very thin LCP film (0.1 mm) and then attached to a rebar the separation between the coil and the rebar will be minimal. This will result in an extremely small magnetic flux crossing the coil's surface and hence the induced voltage will be very small. The material in the rebar is magnetic and highly conductive. Thus it will have eddy currents flowing within it. This will result in significant power loss. To alleviate this problem, several layers of flexible thin ferrite films (0.1 to 0.2 mm) can be utilized underneath the substrate on which the receive coil will be printed or placed. Some examples of coil geometries are shown in FIGS. 4 and 5.

In FIG. 4 (far left), a coil that can be printed on an LCP film and wrapped around a steel rebar is seen. The ferrite layer in between the flexible film and the rebar is not shown. In FIG. 4 (shown in the middle and right) a coil is shown which is made of a three-dimensional groove structure using thin ferrite films. The coil will be constructed by placing thin insulated wires in the ferrite grooves. This will significantly increase the flux linking the embedded receive coil. As before one or more thin layers of ferrite films will be placed between the coil and the steel rebar. The same configuration can also be utilized on the transmit side because the high permeability ferrite material will allow increased magnetic flux concentration within the coil.

Figure 5:
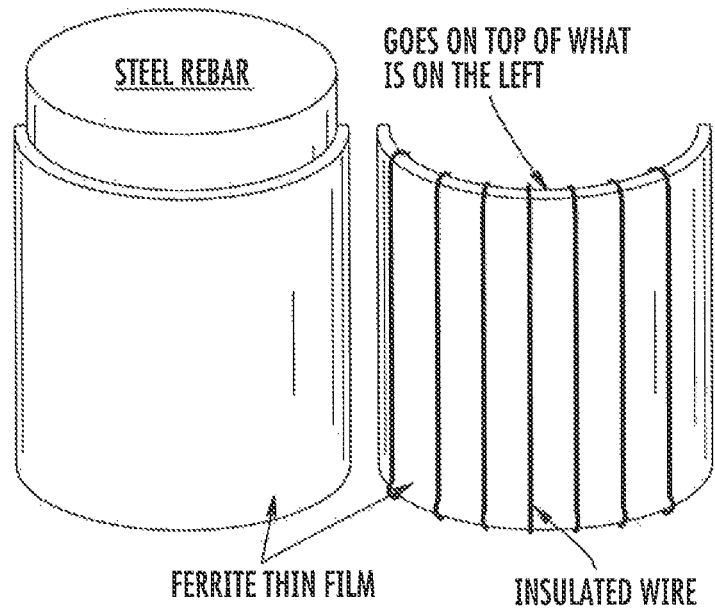
FIG. 5 illustrates coil geometries in accordance with certain aspects of the present disclosure.

A non-printed geometry that can be wrapped around a rebar is shown in FIG. 5. As seen, insulated wires are wrapped around a flexible ferrite core material to develop the coil. Underneath the coil there will be one or more layers of ferrites to separate the coil from the steel rebar.

The present disclosure has the potential to completely revolutionize the way infrastructure health monitoring is performed in the future. In contrast with conventional plug and play retrofitting techniques to monitor existing bridges and infrastructure, the present disclosure relates to a completely different approach. The present disclosure describes embedded wireless sensor technology utilizing near-field wireless power transfer elements inside electromagnetically unfriendly steel reinforced dry and variable humidity concrete structures. The present disclosure further describes a miniature dual-function humidity sensor antenna that can be easily integrated with wireless transceiver modules. An aim of the present disclosure is to maintain low cost by exploiting cheap off the shelf components. The development of a low cost miniature embeddable alternative sensor modality can be very important to infrastructure health monitoring.

The present disclosure is also readily applicable to the monitoring of other infrastructure which are not easily accessible by operators or are too costly and time consuming to do so. One example is the monitor of hazardous nuclear waste inside a nuclear spent fuel facility. It is important to monitor the ongoing activity in such facility yet operator presence is unacceptable. Similarly there is no room to create wire connections or holes in order to prevent leaks and damage. Thus embedded wireless sensors can be key enablers to ensure the safety and security of such facilities. A second example can be underground pipeline monitoring sensors where an acoustic sensor may be used to monitor the health of pipelines or humidity sensors and can be placed in critical locations where there are possibilities of higher humidity and hence incipient corrosion damage to the pipeline. The wireless power transfer devices described herein as well as the dual-function humidity sensor antenna can be critical in such applications.

The present disclosure can be better understood with reference to the following examples.

EXAMPLES

Figure 6A:
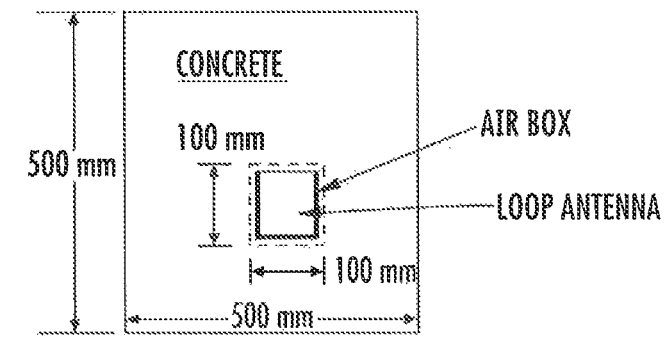
FIG. 6A illustrates diagrams of embedded near-field loop antennae within concrete in accordance with certain aspects of the present disclosure.
Figure 6A:
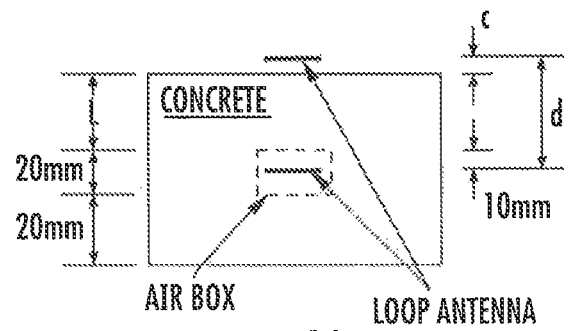
Figure 6B:
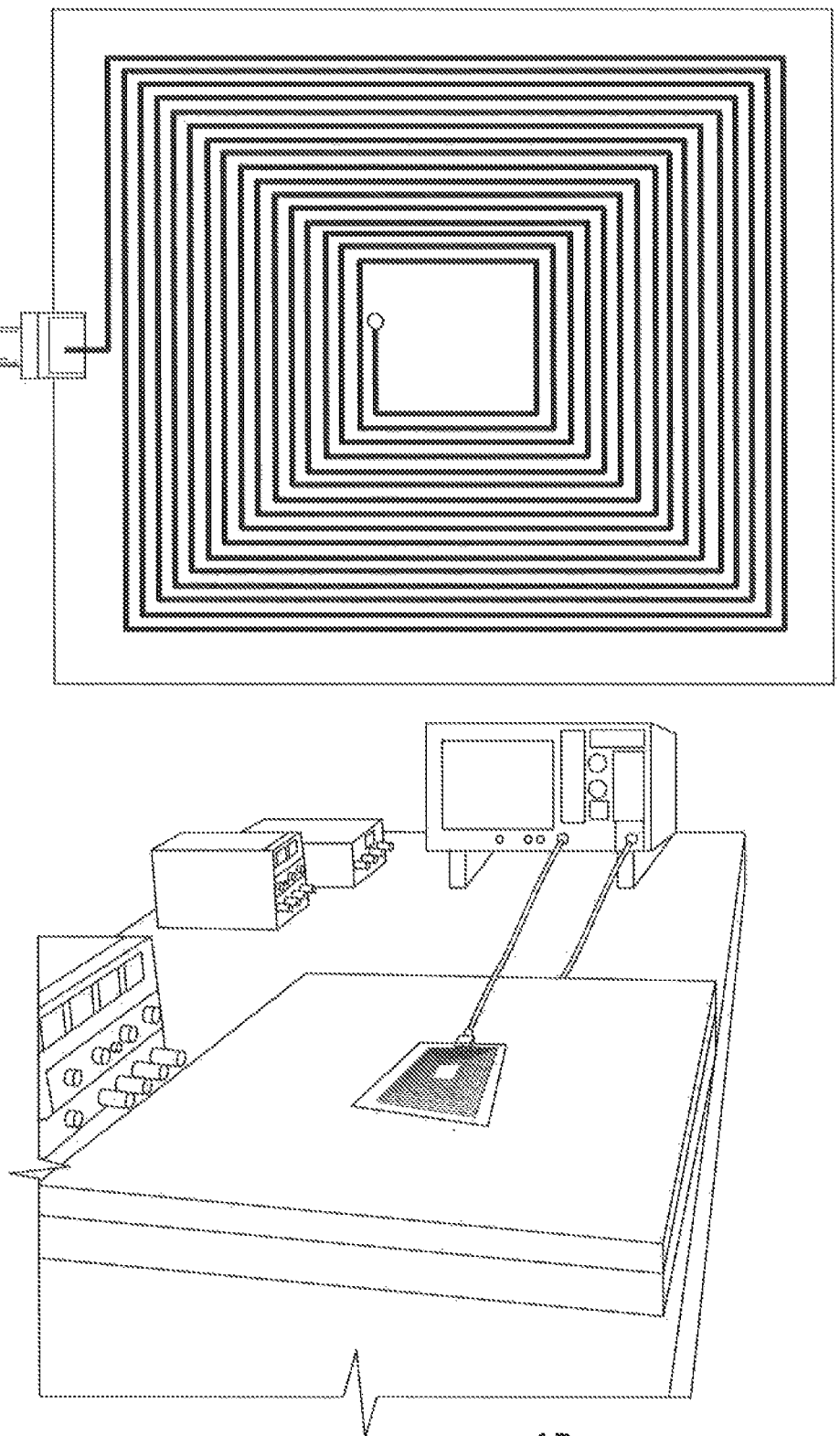
FIG. 6B illustrates a loop antennae in accordance with certain aspects of the present disclosure.
Figure 6C:
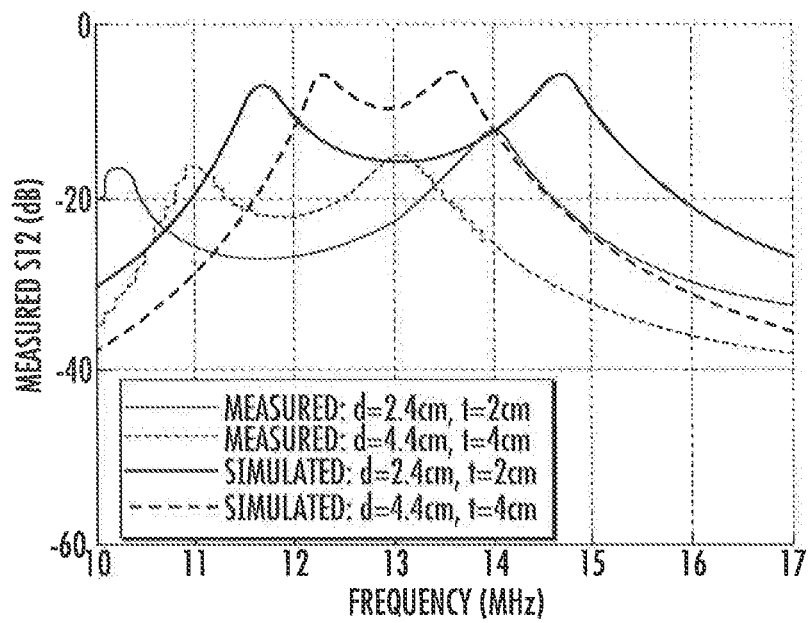
FIG. 6C illustrates transmission measurement setup and transmission data in accordance with certain aspects of the present disclosure.

Recent experimental measurements shown in FIGS. 6A-6C clearly show that wireless power transfer is possible with the proposed near field square loop antenna operating at 13.56 MHz as described further herein.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed:

1. A wireless sensor system comprising:
   internal components configured for locating within a structure, the internal components comprising at least one measurement sensor, an antenna configured for communication with the at least one measurement sensor and for transmitting measurements from the at least one measurement sensor, a wireless transceiver, a microcontroller, a memory, a battery configured to power one or more of the internal components, and a wireless receive coil configured for recharging the battery in response to a magnetic field; and
   external components configured for locating external to the structure, the external components comprising a power source, an oscillator in communication with the power source, and a transmit coil in communication with the oscillator, the transmit coil being configured for generating the magnetic field.

2. The wireless sensor system according to claim 1, wherein the internal components further comprise a liquid crystal polymer film.

3. The wireless sensor system according to claim 2, wherein the wireless receive coil is fabricated on the liquid crystal polymer film.

4. The wireless sensor system according to claim 1, wherein the internal components further comprise a ferrite film.

5. The wireless sensor system according to claim 1, further comprising a base station, the base station configured to wirelessly receive measurements from the at least one measurement sensor.

6. The wireless sensor system according to claim 1, wherein the at least one measurement sensor comprises a strain sensor.

7. The wireless sensor system according to claim 1, wherein the at least one measurement sensor comprises a humidity sensor.

8. The wireless sensor system according to claim 1, wherein the at least one measurement sensor comprises an acceleration sensor.

9. The wireless sensor system according to claim 1, wherein the antenna comprises a humidity sensor.

10. The wireless sensor system according to claim 1, wherein the battery and the wireless transceiver are a component of a patch.

11. The wireless sensor system according to claim 1, wherein the oscillator and the transmit coil are components of a resonator patch.

12. The wireless sensor system according to claim 1, wherein the power source is a solar power source.

13. The wireless sensor system according to claim 1, wherein the at least one measurement sensor comprises an acoustic sensor.

14. The wireless sensor system according to claim 1, wherein the system is configured for monitoring a bridge, a building, a pipeline, a power line, a dam, or a hazardous waste containing structure.

* * * * *